US006990252B2

(12) United States Patent
Shekter

(10) Patent No.: US 6,990,252 B2
(45) Date of Patent: Jan. 24, 2006

(54) SYSTEM FOR MANIPULATING NOISE IN DIGITAL IMAGES

(75) Inventor: Jonathan Martin Shekter, Toronto (CA)

(73) Assignee: Adobe Systems, Inc., San Jose, CA (US)

( * ) Notice: Subject to any disclaimer, the term of this patent is extended or adjusted under 35 U.S.C. 154(b) by 543 days.

(21) Appl. No.: 09/863,025

(22) Filed: May 23, 2001

(65) Prior Publication Data

US 2002/0034337 A1 Mar. 21, 2002

(30) Foreign Application Priority Data

May 23, 2000 (CA) .................................. 2309002

(51) Int. Cl.
*G06K 9/36* (2006.01)
(52) U.S. Cl. ...................... 382/276; 382/108; 382/264; 382/272; 382/275; 382/278; 382/280; 702/191; 702/192; 702/193; 702/194; 702/195; 858/453; 858/463
(58) Field of Classification Search ................ 382/109, 382/159–160, 164, 171, 207, 272–273; 358/453, 358/463; 702/189–195, 199
See application file for complete search history.

(56) References Cited

U.S. PATENT DOCUMENTS

| | | | |
|---|---|---|---|
| 5,033,103 A | * | 7/1991 | Sillart .......................... 382/266 |
| 5,500,685 A | * | 3/1996 | Kokaram ..................... 348/620 |
| 5,548,659 A | * | 8/1996 | Okamoto ..................... 382/107 |
| 5,594,816 A | * | 1/1997 | Kaplan et al. .............. 382/275 |

(Continued)

OTHER PUBLICATIONS

Woods, Jame W. and O'Neil, Sean D., *Subbard Coding of Images*, IEEE RTrans. Accoustics, Speech and Signal Processing, ASSP-34:1278-1288, Oct. 1986.

(Continued)

*Primary Examiner*—Andrew W. Johns
*Assistant Examiner*—Patrick L. Edwards
(74) *Attorney, Agent, or Firm*—Park, Vaughan & Fleming, LLP

(57) ABSTRACT

An apparatus for analyzing the broadband noise content of a digital image comprising the following: a means of automatically identifying regions of originally constant color in the image by analysis of the variance of pixel values of regions of the image; a means of automatically detecting and discarding regions deemed to be unrepresentative of the true noise content of an image, including under- and over-exposed regions; a means of allowing the user to manually select some or all required constant color regions if desired; and, a means of analyzing such constant color regions to generate a parametric or non-parametric model of the noise in the image, including frequency characteristic within and between channels and other characteristics such as phase which might describe structured noise.

40 Claims, 11 Drawing Sheets

U.S. PATENT DOCUMENTS

| | | | | |
|---|---|---|---|---|
| 5,641,596 A | * | 6/1997 | Gray et al. | 430/21 |
| 5,844,627 A | * | 12/1998 | May et al. | 348/607 |
| 6,069,982 A | * | 5/2000 | Reuman | 382/275 |
| 6,366,693 B1 | * | 4/2002 | Silverbrook et al. | 382/162 |
| 6,577,762 B1 | * | 6/2003 | Seeger et al. | 382/173 |
| 6,631,206 B1 | * | 10/2003 | Cheng et al. | 382/164 |
| 6,678,404 B1 | * | 1/2004 | Lee et al. | 382/155 |
| 6,681,054 B1 | * | 1/2004 | Gindele | 382/272 |
| 6,727,942 B1 | * | 4/2004 | Miyano | 348/223.1 |
| 6,804,408 B1 | * | 10/2004 | Gallagher et al. | 382/272 |

OTHER PUBLICATIONS

Simoncelli, Eero and Wlliam Freeman, Edward Adelson, David Heeger, S*hiftable Multi-Scale Transforms*, IEEE Trans. Information Theory, 38(2):587-607, Mar. 1992.

Rossi, J.P., *Digital Techniques of Reducing Television Noise*, J.SMPTE-87:134-140, Mar. 1978.

Simoncelli, Eero and Edward Adelson, *Noise Removal Via Bayesian Wallet Coring*, IEEE Conference on Image Processing, vol. 1, pp. 379-382, Sep. 1996.

* cited by examiner

| LOW-PASS | HIGH-PASS |
|---|---|
| -0.03271 | -0.01386 |
| -0.01241 | -0.05609 |
| 0.11169 | -0.12523 |
| 0.26224 | -0.19354 |
| 0.34206 | 0.77743 |
| 0.26224 | -0.19354 |
| 0.11169 | -0.12523 |
| -0.01241 | -0.05609 |
| -0.03271 | -0.1386 |

FIG. 6

SYSTEM FOR MANIPULATING NOISE IN DIGITAL IMAGES

BACKGROUND OF THE INVENTION

In the present context, noise is broadly defined as random variations in value among the pixels, that comprise a digitally represented image (an "image"), from an ideal representation of the subject of the image. The images can be real or synthetic. Many images include such noise as a result of the processes used to acquire the image from a real-world source or introduced during subsequent processing or reproduction. In the fields of photography, graphic design, visual special effects, production of printed materials, creation of composite photographs, film and video editing, encoding and transmission of images or film or video, and other related fields, it is desirable to control the exact noise content, in both type and amount, of the images being dealt with. For example, excessive noise is often unwanted, in that it may detract from perfect reproduction or interfere with certain subsequent technical processes. Conversely, it may be desirable to add noise to an existing image for aesthetic purposes or to allow for seamless composition with other noisy images.

Noise includes such effects as analog video dropouts, so-called "salt and pepper" noise where occasional isolated pixels are randomly changed to full or zero intensity, dust and scratches on photographic or motion picture negatives or prints, and other image imperfections known generally as "impulse noise". The major characteristic of impulse noise is that it affects only a few isolated and usually randomly located pixels of an image. Impulse noise is generally different to another category of noise called "broad-band".

Generally, broad-band noise alters all pixels of the image. Examples of such noise include film grain, noise originating in the light-sensitive component (e.g. CCD array) of digital still or video cameras, and analog static and in general noise caused by electrical fluctuations in the components of an electronic image recording or reproduction system.

Although not strictly random other types of image effects, present in all pixels of an image are halftone patterns or dither patterns used for image reproduction, or artifacts arising from the image encoding process, specifically so-called "compression artifacts" resulting from digital image or video compression algorithms.

Often, it is desired to remove noise from an image or image sequence. This could be for aesthetic reasons or as in the field of digital image and video compression prior to storage or transmission, image noise of almost any sort reduces the efficacy of such compression systems, because it represents spurious "detail" that the compression algorithm attempts to reproduce. Almost always, the exact noise pattern of an image—as opposed to the general characteristics of the noise—is not of interest, so encoding this information wastes valuable storage space or transmission time.

Noise reduction in digital (and analog) images is a classic problem in signal processing and has been studied for some time. Prior art includes many different types of filtering systems. All of these have various shortcomings. Some filters do not operate well on color images or on image sequences. For example, an algorithm not specifically designed to process image sequences may be temporally unstable with the result that changing artifacts are introduced on a frame-to-frame basis causing a popping or strobing effect which is known as image "chatter". Shortcoming of almost all image noise reduction systems is the amount of noise that can be removed without adversely affecting the image content. All noise reduction systems degrade the source image to some degree during processing, taking the form of a loss of fine image detail or an overall blurring of the image. This tradeoff is unavoidable as fine detail is difficult to distinguish from noise, however a good algorithm will minimize the amount of degradation induced at a given level of noise reduction.

Thus, reducing noise while preserving image sharpness and detail is a difficult problem. Current systems do not operate effectively both across the color channels (if present) and between the frames (if present) of an image sequence. Even for still or monochrome images, existing algorithms represent an often poor solution for broad-band noise, resulting in either little noise reduction or excessive blurring. Hence, the noise reduction techniques employed in practice on broad-band noise are often limited to mild Gaussian blurs or the application of a median filter. On the other hand, adding noise to an existing image is a simpler problem. Precise control over the exact spatial, chromatic, and temporal structure of the noise is desirable. Previous systems have been fairly successfully in achieving this goal, but often the desired effect is not noise in and of itself but matching of the noise structure of two different images. For example, in the field of motion picture special effects, often a computer-generated object is inserted into a photographed scene. The scene is stored as a digital image and contains film grain noise as a result of its chemical photography origin The image of the synthetic object does not, so if these two images are composited naively the lack of film grain where the computer-generated object is visible detracts from the realism of the resulting scene. This defect can be remedied by applying noise which exactly matches the film grain of the real scene to the synthetic image before compositing.

More generally, images obtained at different times, captured with different equipment or recording media, or even captured using the same system but subsequently processed differently, must often be combined into a single composite image. For example, multiple photographic elements recorded under identical conditions will have mis-matched grain noise if they appear scaled differently the final composite image. Simply extracting the noise from one image, replicating it, and re-applying it to the other images making up the composite will not solve this problem, because in this case each image already has pre-existing noise that will interact cumulatively with any newly applied noise.

Accordingly, there is a need for a system targeted specifically to reduce broad-band noise which is capable of exploiting all available information, using multiple frames and color channels if available.

Further there is a need for a system that is capable of automatically analyzing noise in one image and for processing a second image match the noise between the two images, regardless of pre-existing noise in the second image.

SUMMARY OF THE INVENTION

The present invention is not concerned with the category of image effects which is sometimes described as "broad-band noise" as compared to impulse noise. Furthermore, the present invention relates to certain other types of image defects which are present at all pixels of an image. In general any type of noise which results in an appreciably random change to every pixel of an image can be manipulated, at least to some degree, by the system described in this invention.

The invention provides a system for the manipulation of broad-band noise in digital images and image sequences. In the case of noise reduction, the noise is automatically or manually isolated from the source image and a new image generated from the source and the isolated noise which contains as little noise as possible while simultaneously preserving fine image detail and overall sharpness as much as possible. This is achieved through the use of a processing technique which operates simultaneously among nearby pixels within an image, across the multiple channels (if present) of a color image, and between multiple frames (if present) of an image sequence. In the case of noise addition, the user of the system has full control over the amount and type of noise to be added to the source image, including control over the spatial structure and color characteristics of the generated noise, and this noise is combined with the source image using one of a number of combination techniques which nimic the appearance of certain existing types of image recording processes. In the case of noise matching, the noise is automatically or manually isolated from the source image and re-applied to destination image in such a manner as to create either an exact match or a user-specified difference in the noise structure of the source and processed target images.

BRIEF DESCRIPTION OF THE DRAWINGS

Embodiments of the invention will now be described with reference to the following description wherein:

FIG. 6. gives coefficients for a set of filter kernels which can be used to construct a separable. self-inverting pyramidal subband transform useful for noise reduction.

DETAILED DESCRIPTION OF THE PREFERRED EMBODIMENTS

Figure 1:
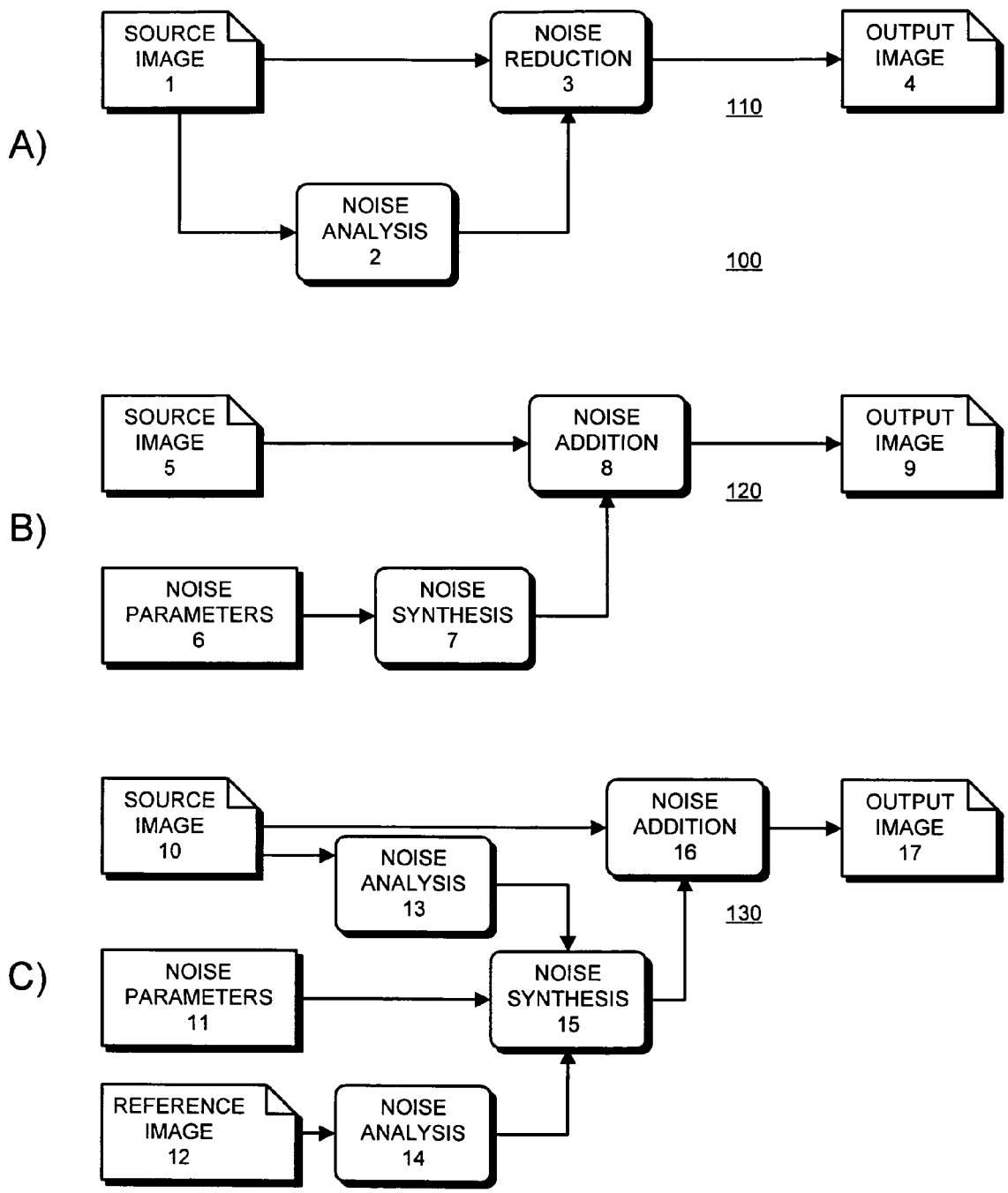
FIGS. 1 (a), (b) and (c) are schematic diagrams indicating the operation of the invention in a) noise reduction, b) noise addition, and c) noise matching modes respectively.

Referring to FIGS. 1(a), (b) & (c), there is shown three fundamentally different uses for the present invention.

FIG. 1a shows a noise reduction system 110 according to a one embodiment of the present invention. In this embodiment a source image 1 is fed into a noise analysis stage 2. The results of this analysis are used by a noise reduction stage 3 to produce an output image 4 with significantly less noise than the source image.

FIG. 1b shows a noise addition system 120 according to a her embodiment of the invention. Again there is a source image 5 and a set of user-specified noise parameters 6 which control the quantity and quality of the noise created in a noise synthesis stage 7. The resulting noise is then combined with the source image in a noise addition stage 8, resulting in an output image 9 which displays noise of the specified type.

FIG. 1c shows a noise matching system 130 according to still further embodiment of the present invention. In this embodiment the source image 10 is processed to have substantially the same noise as a reference image 12. A set of user-specified noise parameters 11 are also used so that the user may change the noise found in the reference image 12 before it is applied to the source image 10. This allows operations such as duplicating the noise found in the reference image 12, but making it slightly more intense, changing the color, adjusting the grain size, etc. To this end the reference image 12 undergoes noise analysis 14. The source image 10 also undergoes its own separate noise analysis 13 so that existing noise in the source image can be accounted for. These analyses, plus the noise parameters 11 are fed into a noise synthesis stage 15 which generates noise which, when combined with the source image 10 in the noise addition stage 16, results in an output image 17 which has noise that matches the noise in the reference image 12 as modified by the user-specified noise parameters 11.

A key step in both noise reduction and noise matching is the analysis of the existing noise in an image. Without such analysis, a noise processing system is forced either to ask the user or make assumptions about the noise content of the source image. Requiring the user to describe the noise has at least two serious problems. First, this precludes the process from being entirely automatic. This might be tolerable during noise reduction, but in the case of noise matching, requiring the user to specify noise characteristics in detail totally defeats the purpose of automated noise matching. Second, even though it may be reasonable to require the user to set parameters such as the total amount of noise, other parameters such as power spectral density (PSD) may be hard for the user to describe. In any case, an incorrect internal model of the noise to be removed or matched will lead to sub-optimal results, so a reliable and fully automatic noise analysis method is needed.

The various components or stages of the systems shown in FIGS. 1(a), (b) & (c) will be described below. The noise analysis is comprised of two stages. First, small samples of "pure noise" are extracted from the image. Of course, if it were really possible to extract the exact noise pattern from any part of the image, then this noise could simply be subtracted from the source image resulting in perfect noise reduction. This is not possible in general, but is possible if the image content in some region is known to be of constant color in the original scene. For example, real images tend to display many constant or nearly constant image regions, such as pieces of the sky, a wall, or flesh tones in a close up of a face.

Figure 2:
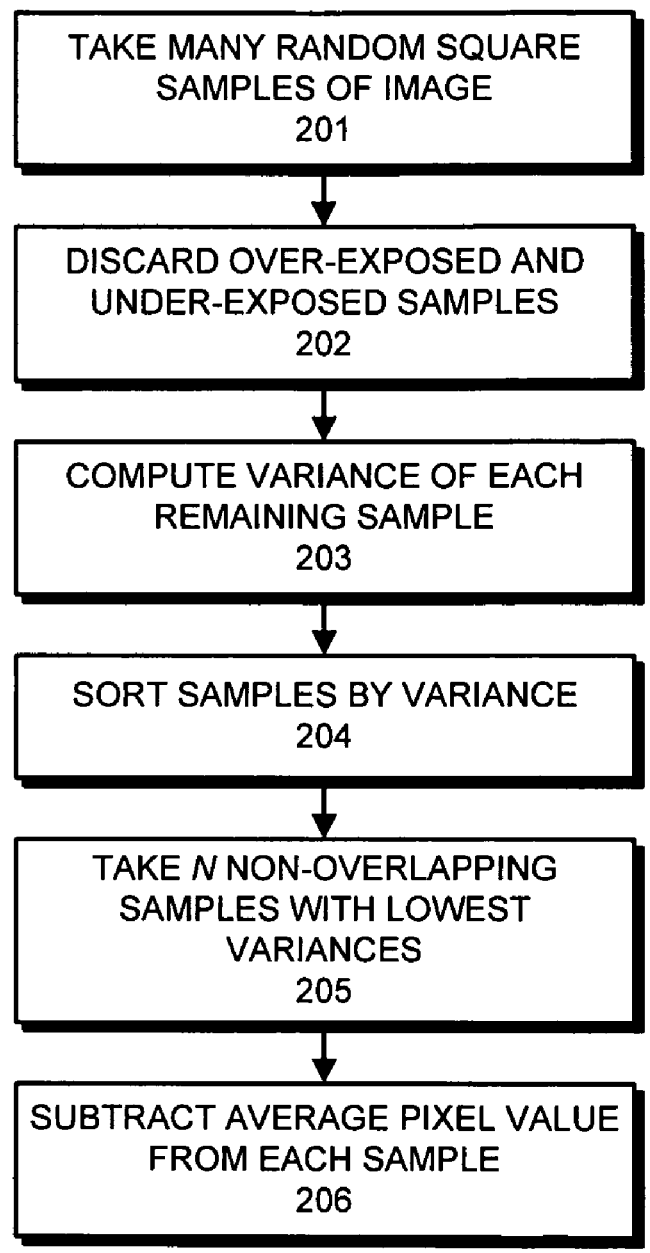
FIG. 2 is a flow chart describing a method for isolating small samples of noise from an arbitrary image.

FIG. 2 shows a flow chart of an automated process for finding regions of known constant properties. In step 1, many randomly placed small square samples are taken in the source image. Both the number samples taken and their size are important. Ideally, a sample would be centered on every pixel but this is computationally expensive. Instead, a random sampling pattern is used which covers the entire image. Enough samples are taken so that the entire image is well covered, and adjacent samples are nearly touching or slightly overlapping to ensure that all regions of the image are covered. The size of each sample would ideally be very large but there is a limit to how big the constant regions of an image are in general. In practice squares of sizes 16 to 32 pixels are large enough to produce good noise estimates while remaining small enough in most cases to fit within several different approximately constant regions of the source image.

In step 2, under-and over-exposed samples are discarded. Regions of the image where the pixel values are saturated or clipped will have artificially low noise and their use will result in an inaccurate noise model. Such extremal regions can be detected through a number of different statistical techniques; in one embodiment of the invention, the average and standard deviation of all pixels in all samples taken are computed, and those regions whose average value is greater than one standard deviation from the overall average are eliminated.

In step 3, the variances of the pixels of each remaining individual sample are computed. The samples are then sorted by these variances as in step 4.

In step 5, all but a few samples with the lowest variances are discarded. This step is the key to the whole noise extraction process and relies upon the following observation: in regions of constant color, a perfect image reproduction system would produce pixels with zero variance. Thus, in a noisy image, the variance in such constant-color regions must be entirely due to noise. Regions of the image which contain image detail as well as noise can only have higher variance than those of constant color. Hence, the process of selecting the samples with the lowest variance is guaranteed to keep samples of constant color if such exist, or the best approximations thereto if such do not exist. Here there is another important parameter, the number of samples retained, denoted N in step 5.

While as many samples as possible are desired for accurate noise modeling, not all images will have a large number of good samples. In practice five to ten samples provide adequate accuracy and are usually available in an arbitrary image. Finally, the mean pixel value of each sample is subtracted in step 6, resulting in samples consisting entirely of noise with no image content.

Note the subtraction in step 6 assumes that the noise is simply added to the image. In many cases this is a good approximation. However in the case of film grain in particular it is more accurate to describe the noise as multiplying the original image. To account for this, before any processing begins each pixel value can be represented by its logarithm. This effectively changes a multiplication operations into addition operations and the rest of the noise processing can proceed as usual. After processing, the output image value is exponentiated to convert from the logarithmic value. This technique is one example of a class of well known image processing operations known to those skilled in the art as homomorphic transformations, applied on a pixel-by-pixel basis to separate a signal from embedded noise. An embodiment of the invention may include any such homomorphic transformation as a pre-processing stage and its inverse as a post-processing stage.

This automated noise extraction method almost always produces superior results in an entirely automated fashion. However, in the rare cases it might fail or if the user wants precise control over the extracted noise, the final 5–10 samples from which the noise is extracted can also be placed manually. One embodiment of the invention includes an option to select samples manually.

Once extracted noise samples are available, the next step of noise analysis is building a mathematical model of the noise. In the present invention, noise is represented chiefly by its power spectral density (PSD). In the case of an image with multiple channels (i.e. a color image) the noise in each channel is assumed to be independent. This assumption is true for a very wide variety of images, and includes common important cases such as film grain and CCD noise. In a case where the noise is correlated between multiple input channels, a decorrelating transform can be applied to transform the image to a color-space where all channels are uncorrelated. Such transforms are well known to those skilled in the art and include the principal components transform (Karhunen-Loeve transform) and the Noise Adjusted Principal Components transform.

Power spectral estimation from a finite number of signal samples is large and complex topic in its own right. While almost any estimation technique could be used, the preferred embodiment of the invention employs a parametric modeling approach. It is well known that the Auto Correlation Functions (ACF) and the PSD are related through Fourier transformation, so it suffices to model the ACF as an indirect definition of the PSD. This is helpful because the assumption is made that noise is correlated only over a very small range, i.e 2 to 4 pixels at most, which is true or approximately true for many types of broadband noise. This means that the auto-correlation function (ACF) of the noise falls off to zero after this range and thus the ACF can be represented with a small number of coefficients. Because the pixels of the input image are real-valued, symmetry reduces the number of coefficients required. Assuming that the ACF displays horizontal symmetry—true for images acquired on any sort of homogeneous media and subsequently processed in raster order—further reduces the number of parameters required Radial symmetry is not assumed because many types of digital image noise display different horizontal and vertical characteristics.

Figure 3:
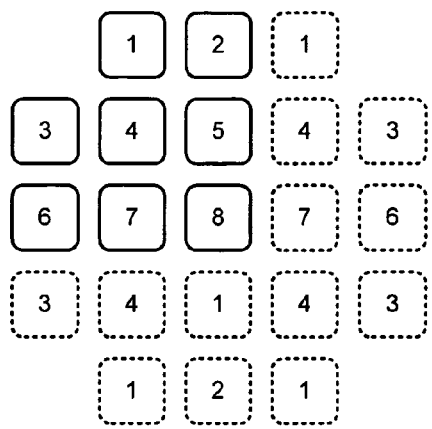
FIG. 3 shows the non-zero pixels of the auto-correlation function of the image noise and the symmetries involved.

For a model which accounts for correlations up to three pixels wide the resulting set of non-zero coefficients is shown in FIG. 3. This model has twenty-one non-zero coefficients but due to symmetry only eight are unique. Coefficient number 8 is the central pixel, and its value represents the correlation of each noise pixel with itself, i.e. the total noise power, while the coefficients around it represent the correlation of a pixel with others nearby in the indicated geometrical arrangement. This is the ACP model used in the preferred embodiment of the invention, but others are possible depending on the noise which must be modeled. More sophisticated handling of halftone patterns requires a larger non-zero ACF.

Given extracted noise samples and an ACF model, noise modeling proceeds as follows. Each ACF coefficient represents certain set of pixels (1, 2, or 4 by symmetry, depending on the coefficient). Applying a discrete Fourier transform (DFT) to this set yields the PSD of noise which is correlated at only those pixels. Generating the PSD corresponding to each ACF model parameter in this fashion yields a set of basis functions which can be linearly combined to model the PSD of any noise which is correlated only over the range of the non-zero coefficients of the ACF model, i.e. 2–4 pixels as assumed. Then, given the set of extracted noise samples, from each is generated a tough estimate of the noise PSD by taking the squared magnitude of the DFT of the sample. Such so-called "periodogram" estimates are very prone to error, even when the periodograms from 5–10 samples are averaged. However, to this averaged periodogram, which is a rough estimate of the noise PSD, a least-squares linear fit can be applied using the PSD basis functions corresponding to the ACF model coefficients. That is, the best fit among all PSDs which can be represented by an ACF of limited diameter is discovered in this fashion. Since thousands of source noise pixels are used to generate just a few ACF model parameters, the resulting estimate is very robust and can yield good results even when the available noise samples are of mediocre quality. For a multi-channel image, this parametric ACF modeling is performed independently for each channel. It is important that each channel have its own noise model because noise often differs between image channels, e.g. in color film the blue channel is typically much noisier than the red and green channels.

The noise extraction and noise modeling processes together comprise the noise analysis stage depicted at blocks 2, 13, and 14 in FIGS. 1(a), (b) & (c). The output of the noise analysis stage is the robustly estimated ACF of the source image noise in each channel.

For the noise reduction stage 3, as shown if FIG. 1(a) the source image FIG. 1(a) is decomposed using a subband transform. Such transforms are well-studied in the signal processing computer vision literature, for example James W. Woods and Sean D. O'Neil.

Figure 4:
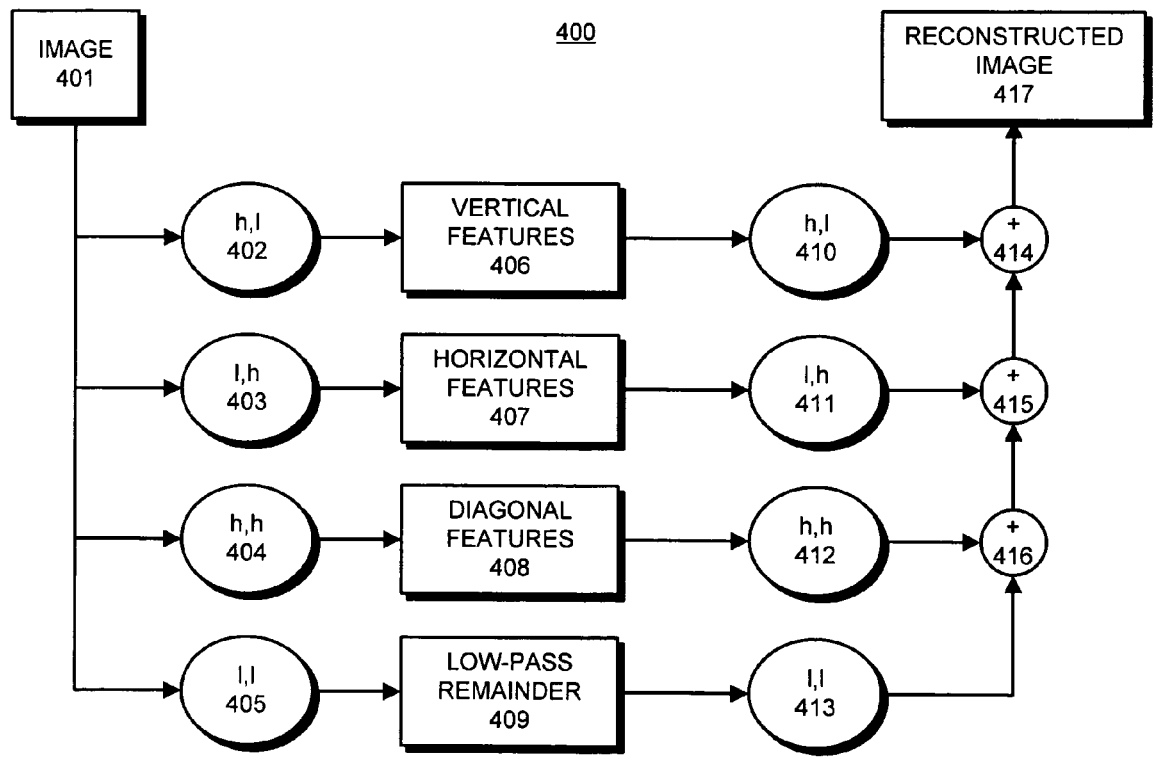
FIG. 4. is a schematic indicating the operation of a self-inverting subband transform.

Subband coding of images. *IEEE Trans. Accoustics. Speech, and Signal Processing*, ASSP-34:1278-1288, October 1986. The type here employed uses two-dimensional separable filters in a pyramidal structure. Referring to FIG. 4 there is shown 400 the structure of this transform and its inverse. The image 1 is fed into a bank of filters 402 to 405. Each of these filters is computed by applying two one-dimensional convolutions, one in the horizontal direction and one in the vertical direction. Only two convolution kernels are used in the entire system, one low-pass kernel (denoted "1" in the Figure) and one high-pass kernel (denoted "h" in the FIG.) All four combinations of these two filters in the horizontal and vertical directions are taken, resulting in four different sets of subband image coefficients 406 to 409 which represent image features oriented predominantly in one direction. For example, filter 402 is applied by convolving with the high-pass filter in the horizontal direction and the low-pass filter in the vertical direction, resulting in a subband image 406 which has the largest magnitude in the vicinity of vertical and near-vertical edges. Subband images 407 and 408 similarly detect image features in horizontal and diagonal orientations. Subband image 409 is the result of low pass filtering in both dimensions, hence it is a blurred copy of the input image. Reapplying these same filtering operations 410 to 413 to each subband image and summing the results 414 to 416 reproduces the original image 417.

The convolution kernels employed are highly specialized. First they are self-inverting, that is. the same filters are used for breaking the image into subbands as for reconstructing it, which means that each kernel is "self detecting" which minimizes energy leakage between subbands. Also, the low-pass filter passes only negligible energy below 0.25 cycles per pixel which allows decimation of the residual low-pass image 409 without violating the Nyquist sampling limit.

Figure 5:
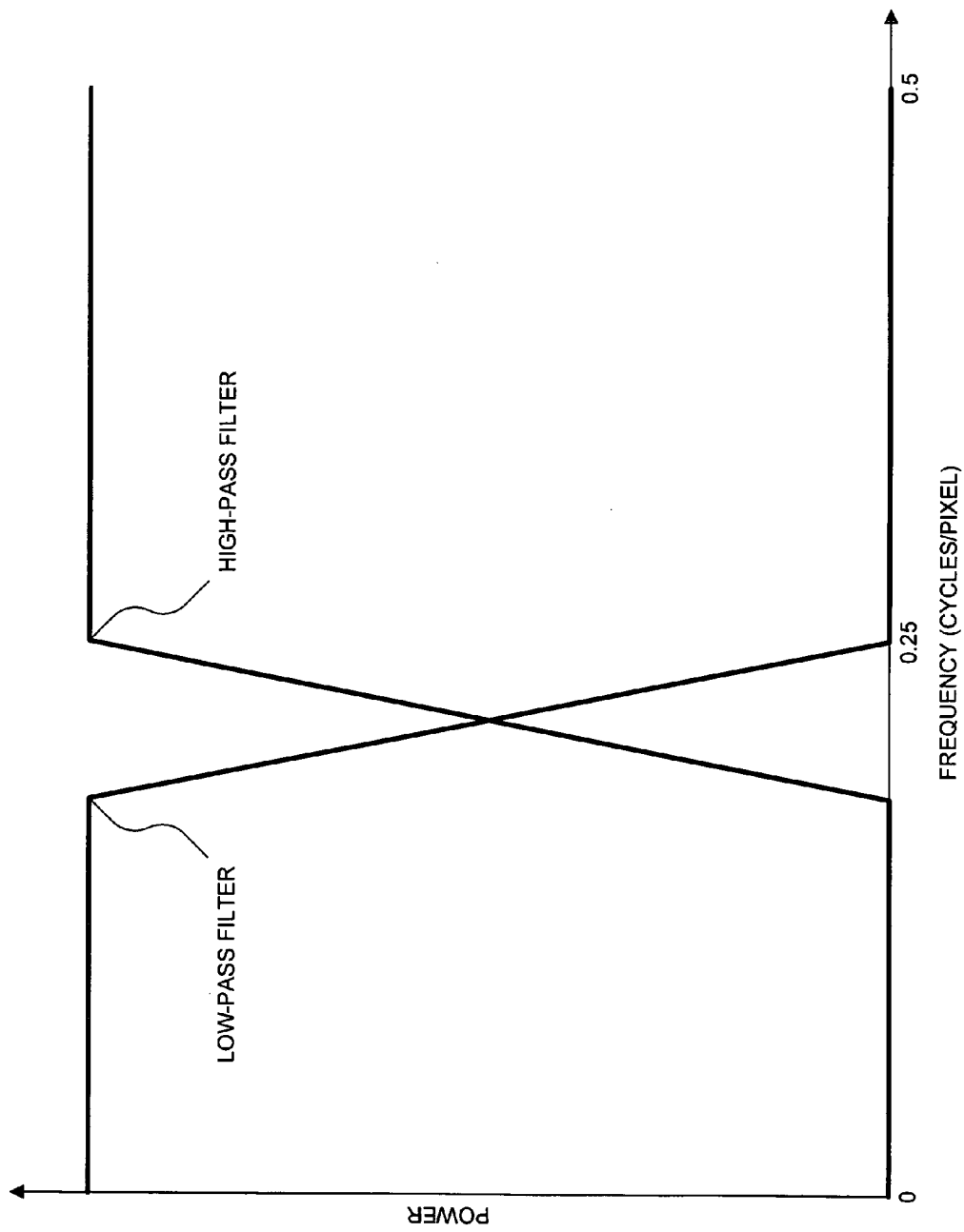
FIG. 5. shows the idealized general form of the frequency response of filter kernels suitable for use in constructing a separable, self-inverting, pyramidal subband transform.

An idealized frequency response of such a low/high pass pair is shown schematically in FIG. 5; note that self-inversion requires that the power of the filter pair sum to one at every frequency. In general all these properties are not simultaneously satisfiable exactly, but good approximations can be designed. One possible set of filter kernels closely satisfying all of the above conditions is given in tabular form in FIG. 6.

Figure 7:
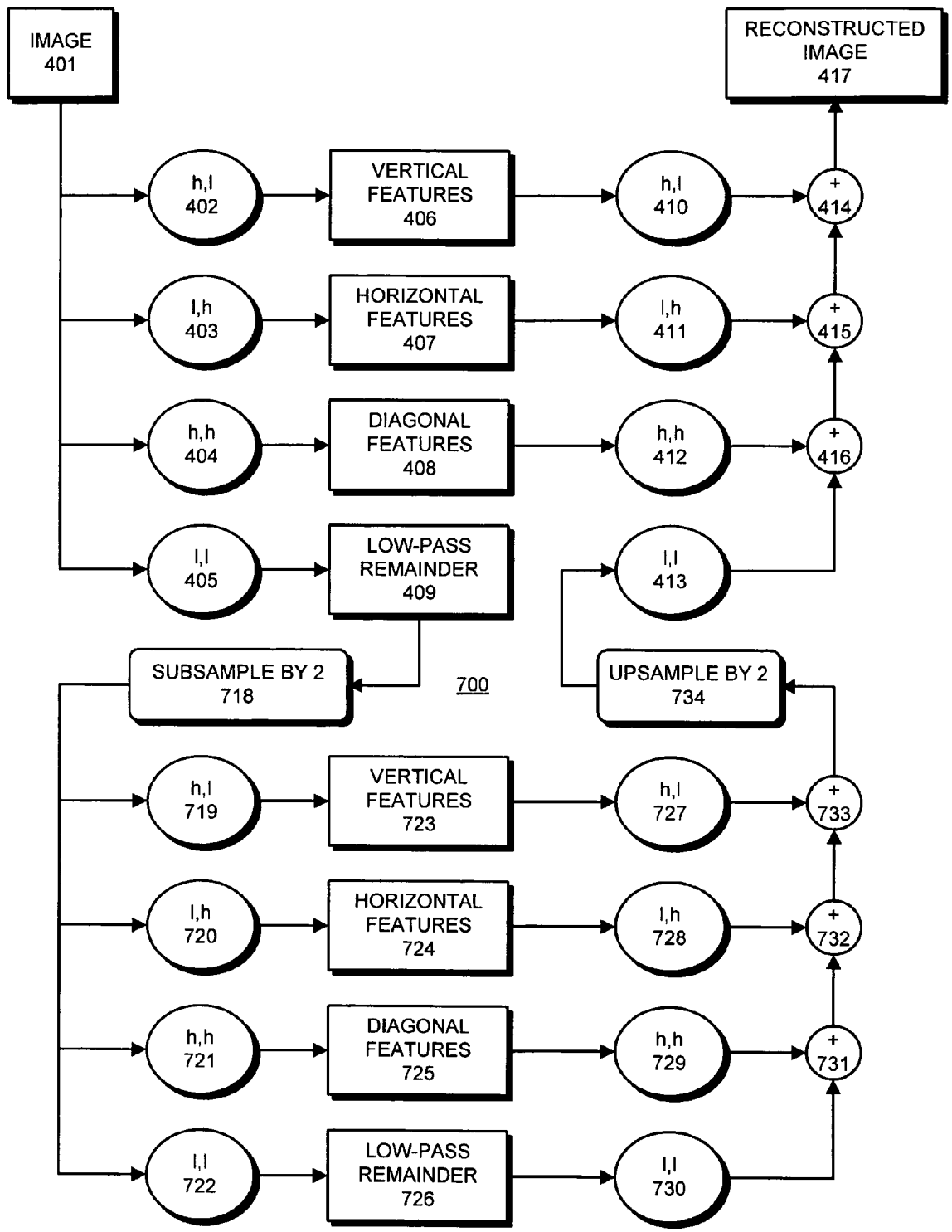
FIG. 7 is a schematic of two levels of a pyramidal subband transform.

The complete subband transform is implemented by cascading this set of filters in a recursive fashion. FIG. 7 shows a schematic diagram 700 of two stages of the complete "pyramidal" transform. As before the input image 1 is processed by a bank of filters 402 to 405. However this time the low-pass residual image 409 is subsampled by a factor of two 718. This subsampled image is then reprocessed with the same filter system, then upsampled by a factor of two 734 to reconstitute the original low-pass residual 409. This is effected by means of filters 719 to 722, identical in operation to filters 402 to 405, which operate on the subsampled low-pass image to produce further subband images 723 to 726. Like the higher-resolution subband coefficients 406 to 409 each of these images represents image detail in a specific orientation, but because of the subsampling 718 each filter acts over a larger effective area, and thus these filters detect image detail at a different scale. Hence subbands 723 to 726 are a further decomposition of the residual low-pass image 409 into components similar too but at one-half the frequency of the subbands 406 to 409. After re-application of the same filters 727 to 730 and summation 731 to 733, the downsampled low-pass image has been reconstructed. This is then upsampled 734 by inserting zeros at every other pixel, and used in place of the original low-pass image 409, hence re-filtered with the low-pass filter 413 and added to the other re-filtered subbands 414 to 416.

The entire system 700 eventually reconstructs the original input image 417 without error. Error free reconstruction is possible because the low-pass filter used in the system does not pass any power above 0.25 cycles per pixel, thus the subsampling operation 718 does not cause any aliasing. This pyramidal structure can be repeated by further downampling the low-pass residual image at each stage, to effect the computation of successively lower-frequency subbands of the original image. For a multi-channel image, this pyramidal subband transform is applied independently to each channel.

This total transformation has several important properties. First, it is efficient. The use of separable filters vastly speeds up the required convolution operations, the pyramidal structure allows efficient recursive computation, and re-filtered subbands can be accumulated one at a time during the reconstruction phase using little intermediate storage. Second, each coefficient is localized in space. This is important as it allows small, local changes to the image, e.g. the suppresion of noise by local modification of one or a few subband coefficients, without far-reaching or global modification of the image content. Third, each coefficient is localized in frequency, which is what gives the subband transform its "feature detecting" qualities that help distinguish image structure and detail from noise. Finally, for noise reduction it is very important that the transform used is significantly over-complete, that is, there are more coefficients than input pixel values. This property is critical in avoiding problems associated with translation invariance, that is, if there were exactly as many output coefficients as input pixel values, certain coefficients representing low-frequency portions of the input signal would necessarily have to be centered on widely spaced pixels, causing energy to shift between different frequency bands as the source image is slowly translated with respect to this coarse grid, as taught in Eeto Simoncelli, William Freeman, Edward Adelson, and David Heeger. Shiftable multi-scale transforms. *IEEE Trans. Information Theory.* 38(2):587–607, March 1992. This is undesirable because slight changes in the position or of objects in the input signal would cause drastic differences in the resulting subband coefficients, resulting in discontinuities in which would be visible as "shimmer" around slowly moving objects. In fact, even when objects are stationary non-overcomplete transforms are prone to "chatter" between frames, due to sensitivity to the exact input pixel values, which are by nature noisy.

The above describes a subband transform utilized in the preferred embodiment of the invention. Other subband transforms are possible and desirable. For example, non-separable filter kernels, while less efficient, may offer superior results in terms of feature discrimination. Similar remarks apply to non-pyramidal transforms. Or, the recursive pyramidal structure could be retained with more subbands per level, which would offer finer frequency discrimination. Almost any transform that is localized in space, localized in frequency, and over-complete could be utilized in the context of this invention. Additionally, transforms which operate on more than one image frame in an image sequence could be applied. Such transforms include particularly those which are sensitive to motion between frames.

The noise model can then be used to determine the amount of noise which each subband image contains. The ACP noise model implicitly assumes that the noise is constant over the entire source image, and the subband transform as described uses space-invariant convolution kernels, so each coefficient of a single subband image has exactly the same noise mixed in with it. That is, there exists a single number for each subband representing the variance due to noise in each coefficient. However, different convolution kernels are used to generate each subband image, so each subband image has a different noise power. In fact, the noise power in each subband image corresponds directly to the amount of source image noise at the frequency and orientation encoded by that subband, so in effect the subband noise powers are themselves a model of the noise in the source image. Hence, determining these noise powers for each set of subband image coefficients is critical to performing effective noise reduction.

Figure 8:
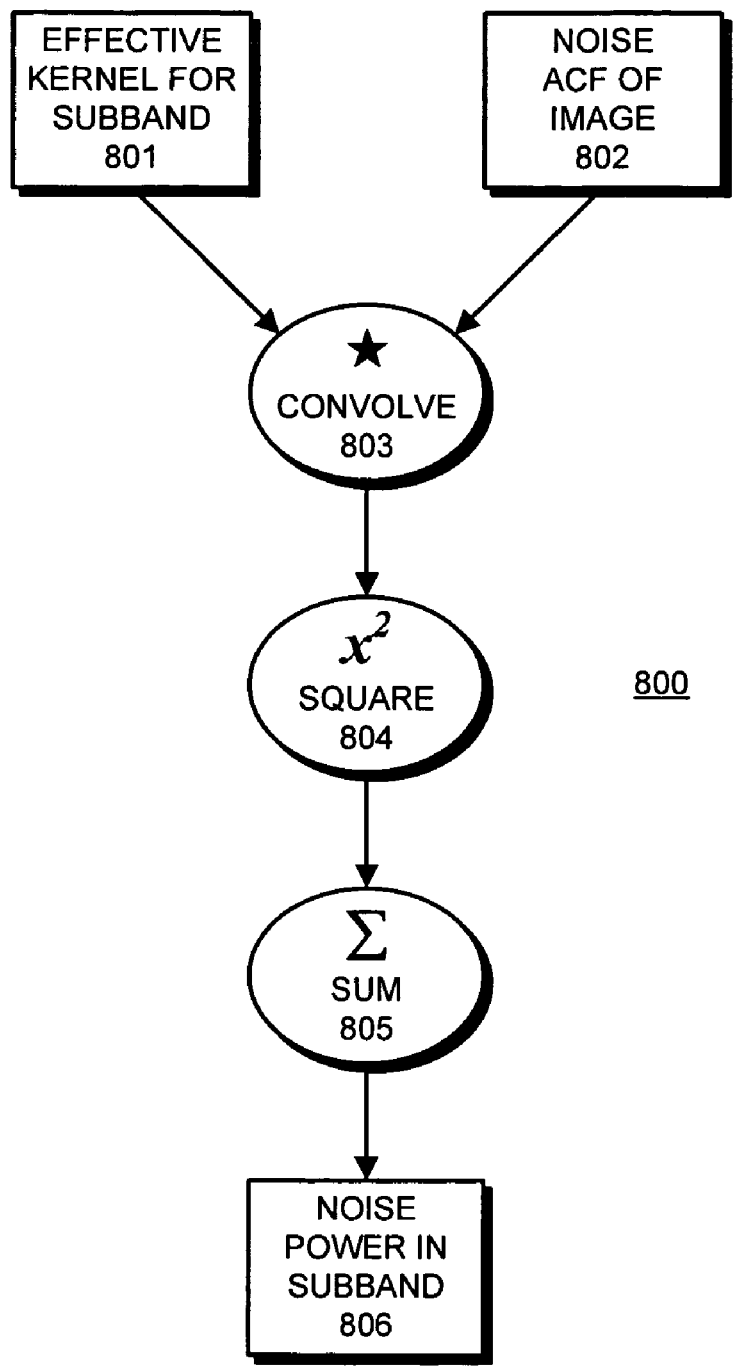
FIG. 8 is a schematic for the process of determining the amount of noise in each subband image, given the filters used in generating the subband and the ACF of the noise in the source image.

Referring to FIG. 8, there is shown a schematic diagram 800 of a process for determining the noise power for a single subband. As discussed previously, to generate each subband coefficient, the source image 1 is convolved with a cascaded series of convolution filters. Because convolution is associative, we could equally well generate each subband coefficient directly by applying one large effective kernel 801, that kernel being the result of convolving all successively applied filters together. We do not do this when performing the subband transformation because it is much more efficient to apply the filters in cascaded fashion, nonetheless such an effective kernel does exist and can be computed. The effective kernel 801 for the subband in question is one input to this process, the other being the ACF of the noise 802 in the source image, parametrically computed from extracted source image noise as described previously. These quantities, each being a two-dimensional array of values, are then two-dimensionally convolved 803 with each other, with missing values required to perform convolution near the edges of arrays assumed to be zero ("zero padding" edge handling). The result of this convolution is another two-dimensional array of values, each of which is then individually squared 804. The resulting squared values are then summed 805 to yield a single number which is the noise power of the subband in question. This process yields the mathematically correct noise power in each subband, as can be proven by those skilled in the art using the usual rules of addition and multiplication of statistical variances. Other computational procedures also yield the correct value and can be used instead, but the preferred embodiment of the invention uses the process depicted in FIG. 8 due to its simplicity and computational efficiency.

As described so far, the complete pyramidal subband transformation system of FIG. 4. merely effects a recreation of the source image. Noise reduction is effected by modification of the subband image coefficients 406 to 408 and 723 to 726 of FIG. 4 (note that the residual low-pass image 409 is not modified, as it is instead further decomposed into subband images 723 to 726) before reconstruction of the image. The process of effecting noise reduction through modification of transformed image coefficients of different kinds including subband coefficients is known. A number of ad-hoc coefficient modification rules could be applied at this point, and such empirical techniques are also known in the art For example, J. P. Rossi. Digital techniques of reducing television noise. *J. SMPTE*, 87:134–140, March 1978 teaches the use of a threshold value. Coefficients which have a magnitude less than this threshold are replaced by zero. This is effective because small coefficients likely encode mostly noise as opposed to desired image features, which would cause larger coefficient values due to the feature-detecting transforms employed. Clearly the threshold employed should be related to the computed noise power in each subband, but the exact relationship is somewhat arbitrary. In a similar manner, many other coefficient modification schemes have been employed, all of which take the form of a non-linear reduction in magnitude of small coefficient values, a process generally known as "coring". However such approaches are found wanting, because subband coefficient modification, if not done sufficiently carefully, has the effect of removing image detail and sharpness as well as noise. This is the principal issue facing designers and users of noise reduction systems, and the improvement in detail retention and sharpness over the prior art is a key advantage of the noise reduction portion of the present invention.

Aside from sub-optimal coefficient modification rules, the prior methods have several other drawbacks. One of these is the inability to use multiple color channels if present. While there do exist in the literature, a number of noise reduction algorithms which do use information from multiple color channels, none of the noise reduction systems of the localized transform coefficient modification type—which has been found to produce superior results on broad-band noise—are able to utilize the values of multiple color channels simultaneously. This is an important point, because the color channels of an image are typically highly correlated, e.g. image features almost always appear in the same place in all three channels. Essentially, the different color channels of an image contain redundant information, and this redundancy allows a greater immunity to noise, if the noise reduction system is able to detect and exploit it. In other words, exploiting the correlations between color channels allows greater accuracy in discerning the existence, intensity, and location of image details, resulting in greater sharpness and detail preservation for the same amount of noise reduction.

It is not immediately obvious how to effect such color-sensitive subband coefficient modification. As a theoretical starting point, consider the teachings of Eero Simoncelli and Edward Adelson. Noise removal via Bayesian wavelet coring. *IEEE Conference on Image Processing*, volume 1, pp. 379–382, September 1996. This reference expands the notion of coefficient thresholding, i.e. coring, to place it in the theoretical framework of Bayesian estimation, familiar to those skilled in the art of statistical estimation. Briefly, let the range of coefficient values in a particular subband be described by a probability distribution function (PDF) $p(x)$. The distribution of noise in each subband coefficient is described by some other PDF $p_n(x)$. From these two distributions, plus the observed noisy coefficient value y we wish to determine the likely value of the original, noiseless coefficient value x. The theory of Bayesian estimation tells us that the estimate of x which has the minimal quadratic error over all possible estimates is given by $$x = \frac{\int x \cdot p_n(y-x) \cdot p(x) dx}{\int p_n(y-x) \cdot p(x) dx}$$

The noise PDF $p_n(x)$ is known from the noise analysis stage, in particular it is a zero-mean Gaussian with variance equal to the computed noise power in the subband. The coefficient PDF $p(x)$ is not so easily discovered, as it represents an image model, i.e. it $$p(x) \propto \exp(-|x/s|^p)$$

encodes all our prior expectations about what an image "looks like". However, in practice subband coefficients tend to fall in a reasonably narrow or "sharp" distribution around zero. Simoncelli et al models this distribution with a two parameter function (the normalization coefficient has been omitted for clarity.) Here s controls the width of the distribution while p determines the shape, when p=2 the distribution is Gaussian, while lower values give sharper functions. Subband coefficient distributions typically have p in the range of 0.5–1.5. In practice only the observed noisy coefficient distribution $p_y(y)$ is available, however $p(x)$ is related to $p_y(y)$ through the equation $$P_y(y) = \int p_n(y-x) p(x) dx$$

This gives an analytic expression for the observed distribution in terms of the (known) noise distribution $p_n(x)$ and the parametric model for the noiseless coefficient distribution $p(x)$. Using this equation the scale and shape parameters s and p which give the best fit between the theoretical noisy coefficient distribution as described by the above equation and the actual observed noisy coefficient distribution can be determined, This fit is typically performed through nonlinear numerical optimization.

With the distributions $p_n(x)$ and $p(x)$ so determined, the Bayesian estimation integral may be applied directly. As limited by the accuracy of the noise and coefficient models, the best possible estimate of the noiseless coefficient value is thereby obtained. In practice, because the estimation integral is expensive to compute, it is precalculated at fixed intervals to generate a look-up table (LUT) of values, which is used during the actual processing of subband coefficient values. The entire proces of noise power computation, LUT generation, and coefficient estimation process is repeated independently for each subband.

For color images however three corresponding subband coefficients are available, describing the red, green, and blue (RGB) channels. These coefficients must simultaneously considered for optimal noise reduction. The basic Bayesian estimation equation extends in a natural manner to his three-dimensional problem. Now, $p(x)$ is replaced by $p(r, g, b)$ which is the three-dimensional joint probability the red, green, and blue subband coefficients simultaneously taking on particular values. Similarly $p_n(r, g, b)$ is the joint probability of simultaneous occurrence of particular noise values in all three channels. By assumption, the noise is Gaussian in each channel, with noise power discovered as described above, and uncorrelated between channels. Thus $p_n(r, g, b)$ is an axis-aligned multi-variate Gaussian distribution. The distribution of theoretically noiseless coefficients $p(r, g, b)$ is again unknown, and must again be modeled parametrically.

It has long been known that the pixels of real images vary much more in intensity than in color. The same comment applies to subband coefficients. Therefore, to aid in representing the distribution of triplets of RGB coefficients, the parametric model $p(r, g, b)$ is defined in a rotated color space having three components I,S,T where I is an intensity value, aligned along the major axis of RGB color space and S and T ate perpendicular to this axis, defining the chromatic component of the color. Other transformations which place emphasis on intensity, such as the YIQ colorspace or a Karhunen-Loeve transformation, could also be used. In such a color space, the preferred embodiment of the invention uses the following parametric model for noiseless subband coefficients:

$$p(I, c) \propto \exp\left(-\left|\frac{I}{s}\right|^p\right) \exp\left(-\frac{c^T R c}{2}\right)$$

where $c = [S, T]^T$, a column vector of the chromatic portion of the color value. This describes the total distribution as a separable product intensity and color. The intensity is modeled as in the single-channel case, with two scalar parameters s and p which control the width and shape of the distribution. The chromatic variables S and T are assumed distributed in a two-dimensional Gaussian fashion, described by the 2×2 positive-definite matrix R, a familiar representation for a multivariate Gaussian distribution. The form of this model allows the model parameters and hence the a-priori distribution of noiseless subband coefficients to be determined using relatively simple numerical optimization techniques. More sophisticated models and fitting techniques are possible and could be used in the context of this invention.

Figure 9:
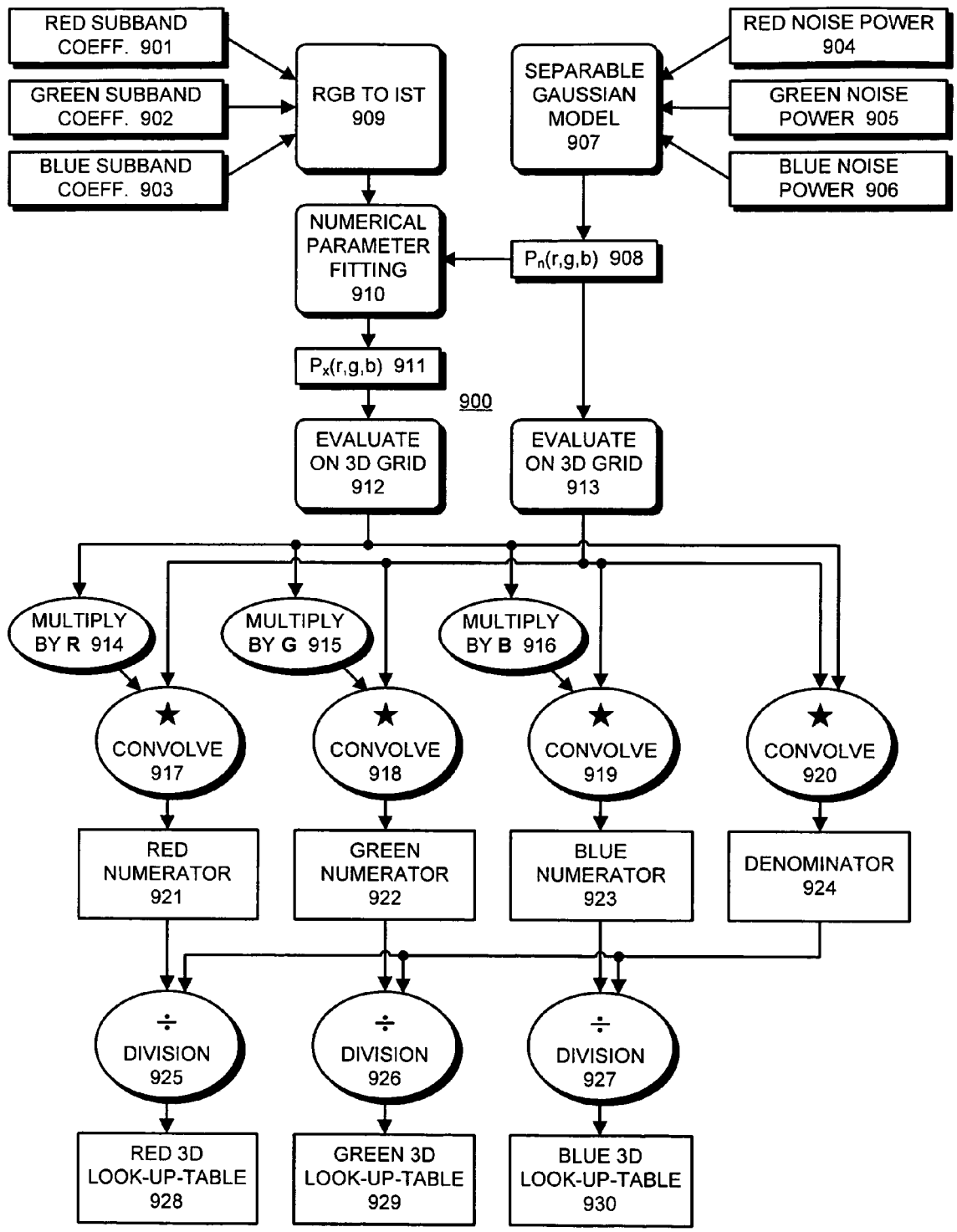
FIG. 9 is a schematic illustrating the generation of three-dimensional look-up tables for each color channel which effect optimum subband coefficient modification for noise reduction in a particular subband.

Using this model, three three-dimensional look up tables 928, 929, 930, one for each color channel, are generated for each subband as depicted in FIG. 9. First, the previously computed RGB noise powers 904 to 906 for the subband in question are substituted into a seprable Gaussian model 907 which gives directly the joint PDF of the noise all channels simultaneously $p_n(r, g, b)$ 8. The actual subband coefficient data for each channel 901 to 903 are then transformed into IST (intensity/chroma) space 909 as described above. Using the multidimensional model described above and the known noise distribution 908, a numerical optimization process 910 takes place to discover the parameter values s, p, R which generate a theoretical noisy coefficient distribution which best fits the observed noisty coefficient distribution. These parameters result in a model of the joint PDF of theoretically noiseless subband coefficients p(r, g, b) 11. Then, both the coefficient and noise models are evaluated on an evenly spaced 3D grid of RGB values 912 & 913 respectively.

From this point on, generation of the 3D tables 928 to 930 for each channel follows a literal interpretation of the optimum Bayesian estimation integral given above. In this case, all operations are performed on functions represented as finite 3D grids of values. Note that the integrals in the Bayesian estimation equation are all in fact convolutions with the noise PDF $p_n$ which in this case requires discrete convolutions on large three-dimensional grids. This would typically be an expensive operation, however the noise model $p_n$(r, g, b) is separable because, by assumption, the noise is uncorrelated between channels. Hence these 3D convolutions can be performed very efficiently by applying along each grid dimension a different one-dimensional convolution.

Figure 10:
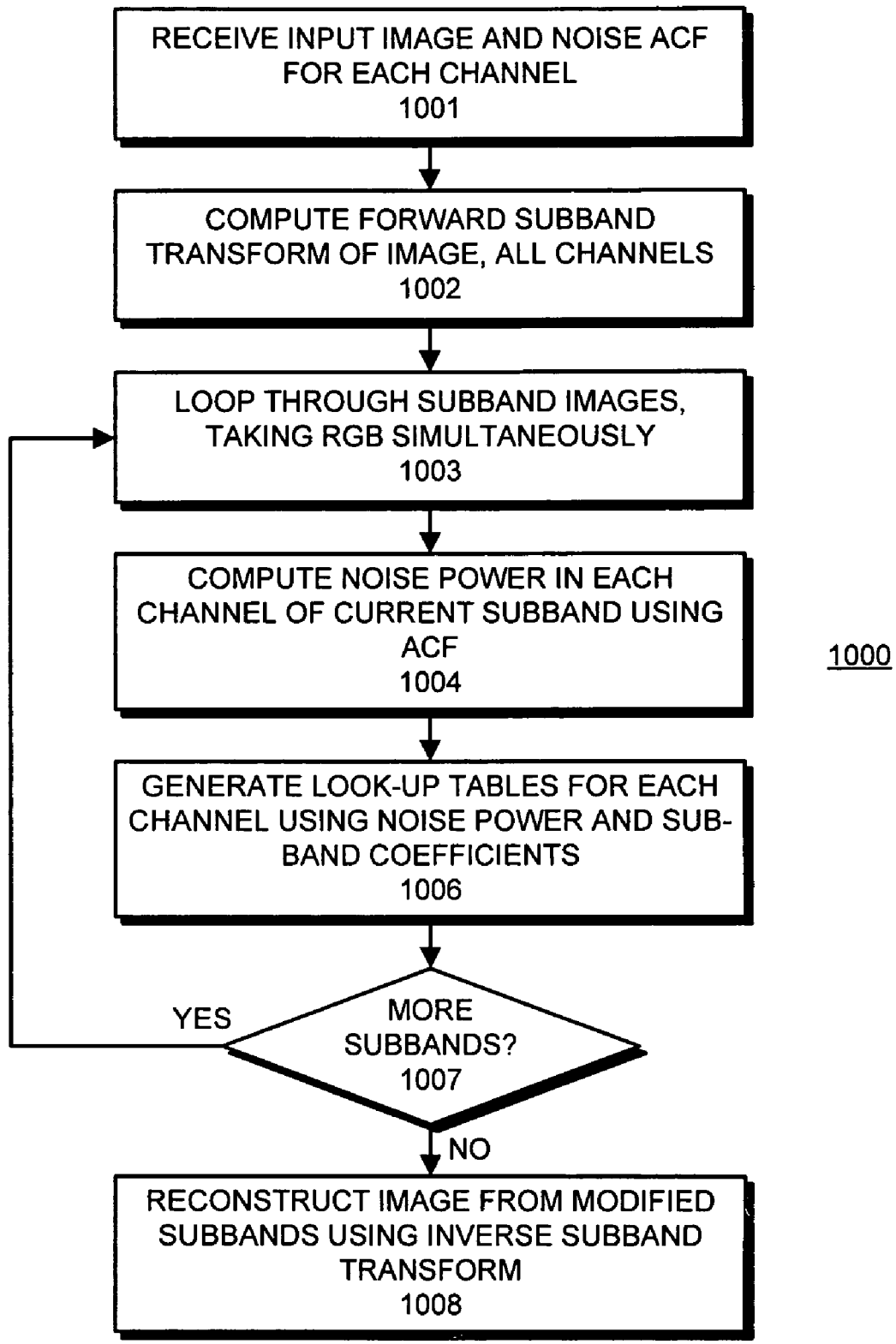
FIG. 10. is a flowchart of the total noise-reduction process.

Continuing with FIG. 9, first a grid of denominator terms 924 is generated by convolution 920 of the noise model grid 913 and coefficient model grid 912. Processing for each color channel is similar. First, the coefficient model grid 912 is multiplied element-wise by either the red, green, or blue coordinate value at each grid point 914 to 916. These multiplied grids are then convolved 917 to 919 with the noise grid 913 yielding a grid of numerator values for each color channel 921 to 923. Element-wise division 925 to 927 produces the final 3D look-up-tables 928 to 930 for each color channel. These LUTs describe the optimal noise-reduced estimate for a single subband coefficient in each channel as a unction of the simultaneous values of that coefficient in all tree channels, The total the noise reduction stage 3 of FIG. 1 is effected as described by the flow chart 1000 in FIG. 10. The inputs 1001 to the process are the image to be cleaned and the ACF of the noise in each channel as determined through prior noise analysis. Each channel of the source image is first decomposed into its component subbands 1002 using the forward portion of the pyramidal subband transform previously indicated in FIG. 7. These subband images are then looped over 1003, considering the coefficients across three color channels simultaneously at each step. For each subband, the noise power apparent in the coefficients for each color channel is computed 1004 as previously indicated in FIG. 8. Given these noise powers and the subband coefficients for each channel, three 3D look-up-tables are computed 1005 as previously indicated in FIG. 9. The subband coefficients for each channel are then modified 1006, three at a time, using these look-up-tables. This process is repeated 1007 for each remaining subband. Finally, when all subbands have been processed, the inverse pyramidal subband transform is applied as previously indicated in FIG. 7 to regenerate the noise-reduced output image.

After processing, it is sometimes desirable to apply an additional filtering computation which operates between frames ("temporal filtering".) This can result in additional noise reduction. A number of such filtering algorithms are known to those in the art, such as those based on motion detection or optical flow techniques, and any of these could be applied as a post-process after multiple frames have been reconstructed as described above, In a similar fashion, any sort of sharpening or color correct filter could be applied as a post-processing step to improve image appearance.

Figure 11:
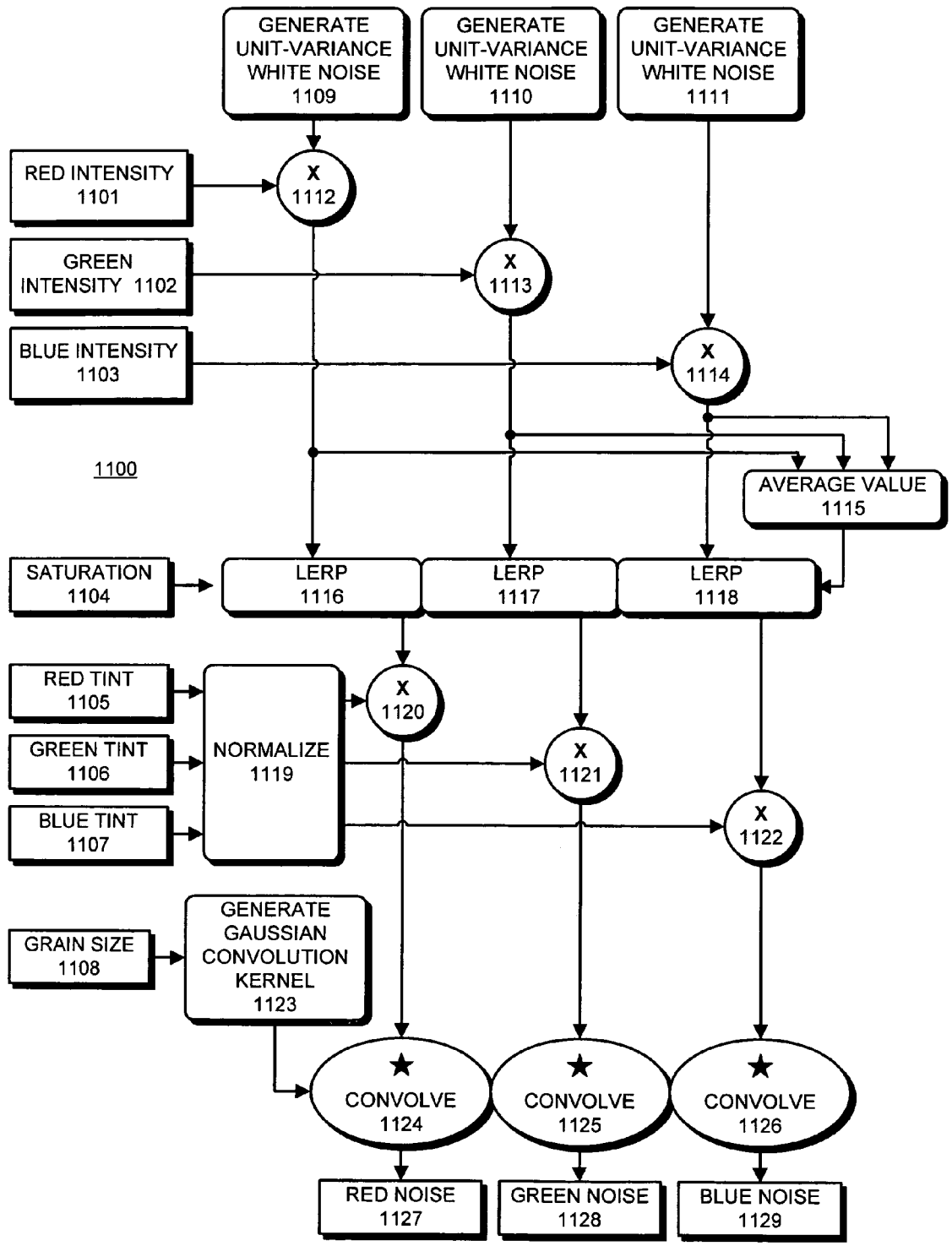
FIG. 11. is a schematic illustrating one embodiment the user-controllable noise parameters and noise synthesis process in the absence of a reference image.

In the case of noise addition in the absence of a reference image, as in FIG. 1*b*, a set of parameters are made available to the user to control the generated noise. FIG. 11 depicts a schematic diagram of one embodiment 1100 where these parameters are limited to a small set of controls 1101 to 1108. These are used to modulate tree independent guassian white noise sources 1109 to 1111. Each of these sources produces a field of white noise equal in size to the source image. Three intensity parameters 1101 to 1103 allow individual control 1112 to 1114 of the amount of noise in each channel by multiplication The average value of all three channels is then computed 1115. The saturation parameter 1104 controls three linear interpolators 1116 which blend between each channel and the average value of all channels. This allows the user to control the amount of correlation between channels. When saturation is zero, the three channels are left unmixed, while when saturation is at its maximum of one, all channels are replaced by their collective average value, resulting in colorless (greyscale) noise. Next, the user can control the overall tonal balance of the noise using the tint controls 1105 to 1107. So as not to change the overall noise power, these three values are first normalized 1119 such that the sum of their squared values is equal to one. Then, each channel is multiplied 1120 to 1122 by the corresponding normalized tint value. Finally, a grain size parameter 1108 controls the size of a generated Gaussian convolution kernel 1123, which is applied to each channel independently 1124 to 1126 to control gross frequency characteristics of the final generated noise 1127 to 1129.

Note that only one embodiment of the noise parameters and noise synthesis process has been described. This invention includes synthesis of any type of noise describable by the PSDs of each channel and the complex-valued cross-PSDs between channels. Naturally, full specification of these six functions would be a very awkward and unintuitive process for the user, so instead the user is offered small set of more intuitive controls. This limits the noise that can be specified, of course, but it makes user-directed parametric noise synthesis practical. The embodiment described contains controls that have been found to be generally useful and almost all embodiments can advantageously employ these parameters; e.g. the overall intensity of noise in each channel is of fundamental interest. Other embodiments might include other parameters, in particular better control over the frequency characteristics of the noise, rather than just the single grain size parameter 1108 as indicated. Such expanded frequency controls can be used to generate structured noise, e.g. halftone patterns.

Once the color noise field is generated it is combined with the source image as indicated in stage 8 of FIG. 1. In the simplest case, the noise is simply added to the pixels of the source image. This approximates some types of noise, such as video static. To better simulate film grain, the noise can instead be exponentiated and multiplied with the source pixels. This mimics film grain, which is additive in terms of optical density, which is a logarithmic measure of pixel intensity. However, multiplication of the source pixels has the drawback that dark regions of the image wilt display very little noise, which is actually the opposite of what is observed in practice with film grain. To remedy this, the pixel values can be inverted before multiplication, then inverted back, which simulates film grain noise more closely in that darker regions will have much more noise than lighter regions of the image. Other combination procedures are possible, and in general any image processing operation capable of combining two images can be used. though not every such operation may be "realistic". The preferred embodiment of the invention includes a method for selecting between different combination procedures, including at least the three described above.

Figure 12:
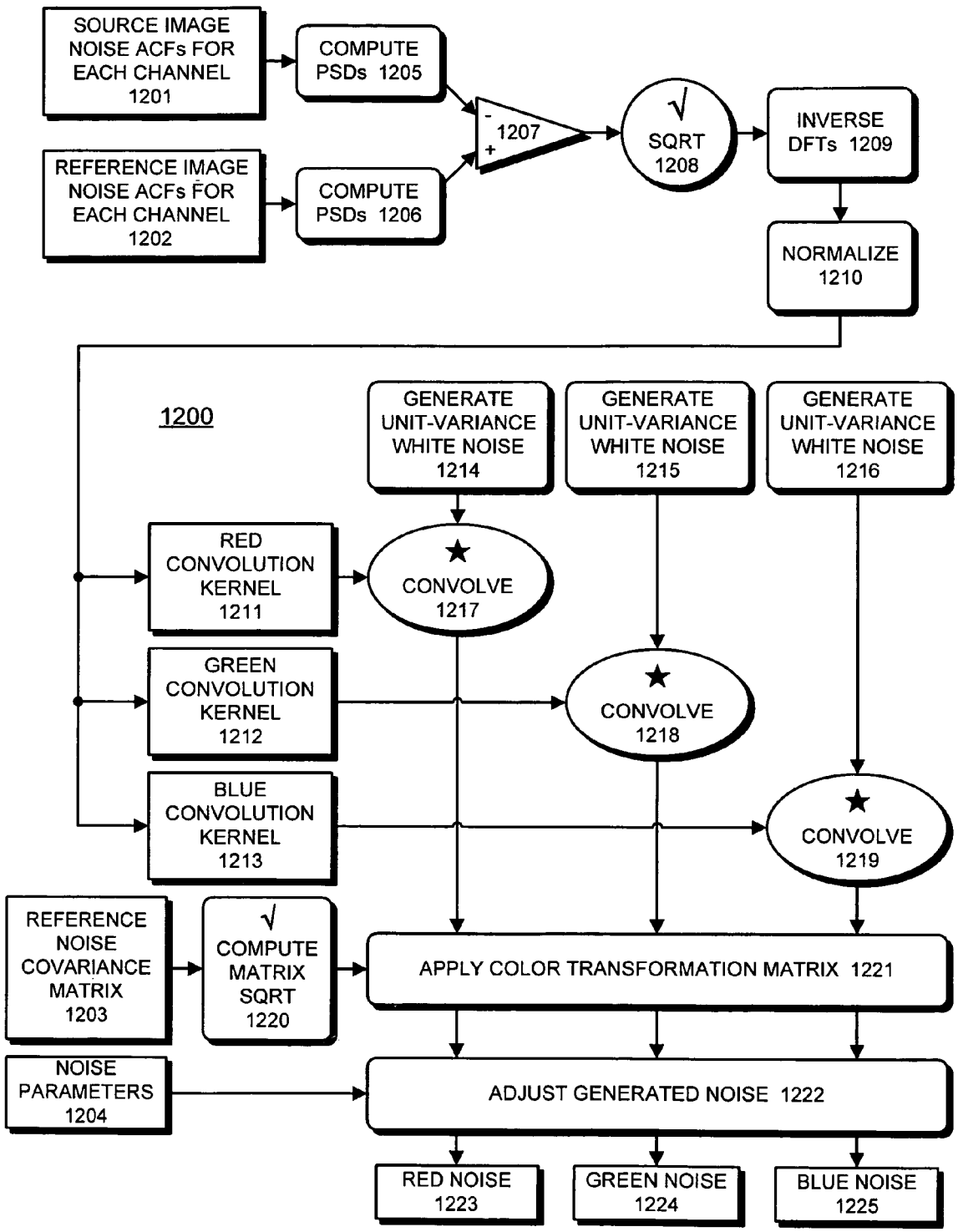
FIG. 12. is a schematic illustrating one embodiment of a noise synthesis method for use in matching noise between images.

In the case of noise matching, as in FIG. 1c, the object is to mimic the frequency and color structure of the noise in a reference image, as modified by the user. To this end a different noise synthesis approach is employed as shown schematically 1200 in FIG. 12. The noise ACEs for each channel of the source image 1201 and reference image 1202 are taken as inputs. For each channel of the source image, the noise ACF is converted to a noise PSD by means of a discrete Fourier transform 1205 and similarly for the noise ACF 1206 of each channel of the reference image. The source noise PSDs are then subtracted from the corresponding reference PSDs 1207. Where the result of this subtraction would be negative, it is clipped to zero. This occurs at any frequency where there is more noise power in the source image than the reference image. If only a few such frequencies exist, the resulting noise match will still be very close, however if the source contains substantially more noise than the reference image this noise must be reduced first by the noise reduction technique described earlier. Continuing with the Figure, the resulting differenced PSDs for each channel undergo an element-wise square root 1208 followed by an inverse DFT 1209 and then normalization to unity power 1210. This results in a set of convolution kernels for each channel 1211 to 1213. Three independent white noise fields are then generated 1214 to 1216 each being the same size as the source image. Each noise field is then convolved 1217 to 1219 with the kernel for a particular channel.

From the noise analysis stage is also obtained the channel covariance matrix of the reference noise 1203. This is a 3×3 element matrix which indicates the expected products of all combinations of two color channels (being the same or different) within the same pixel, and is familiar to those skilled in the art. It is computed in the obvious fashion from the noise samples, by taking the average of the outer products of all extracted noise pixel values. The matrix square root 1220 of the covariance matrix is computed, which has the property that the matrix square root multiplied by its transpose equals the covariance matrix. This matrix square root can be computed by any of the standard methods of linear algebra such as eigenvalue/eigenvector diagonalization or singular value decomposition (SVD). In the preferred embodiment SVD is used due to its superior handling of underdetermined and/or numerically difficult cases. This matrix square root is then applied as a color transformation matrix 1221 to the previously convolved noise fields.

The transformed noise fields now have exactly the same per-channel power and inter-channel correlations as the reference noise, that is, this color transformation operation causes the synthesized noise to have the same covariance matrix as the reference noise. It is now apparent why the convolution kernels 1211 to 1213 were normalized 1210. If this normalization were not performed, then application of this transformation would result in incorrect per-channel noise power.

The transformed noise is then adjusted 1122 using a set of user-supplied parameters 1204 not dissimilar to those employed in generating noise without a reference image. These adjustments implemented much as as described previously. In particular the color transformed noise for each channel can be substituted for the three white noise sources of FIG. 11. This process allows the user to extract the noise from a reference image an re-apply it to the source image modified in some fashion, e.g. slighly stronger, less saturated, color corrected, etc.

Finally, once synthesized as described, the generated noise is combined with the source image. As with noise synthesized without a reference image, this can happen in any of a number of different ways, such as addition, multiplication by the exponent, multiplication of the inverse source image by the exponent, etc. The preferred embodiment allows the user to select the combination mode from at least these choices and possibly more.

One embodiment of the noise synthesis procedure for matching noise has been described. Additional refinements are possible and desirable. For example, the embodiment described is incapable of reproducing structured noise which is highly correlated between channels such as halftone patterns. Such noise could be automatically matched if cross-channel PSDs, including relative phase information, were extracted in addition to the single channel PSDs. This information could be used to synthesize 3D convolution kernels which operate between channels as opposed to the indicated 2D convolution kernels which operate within a single channel. This would allow various types of structured noise to be automatically reproduced. Also, as with noise synthesis without a reference image, the provided user controls for adjusting the synthesized noise can vary depending on the application.

While the invention has been described in connection with a specific embodiment thereof and in a specific use, various modifications thereof will occur to those skilled in the art without departing from the spirit of the invention.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

We claim:

1. A method of analyzing noise content in a digital image, the method comprising:

identifying regions of approximately constant pixel value within the digital image;

selecting a predetermined number of said identified regions based on pixel value variances within each said identified region;

analyzing said selected regions to generate a mathematical model of noise present in the digital image, wherein said analyzing said selected regions to generate a mathematical model of the noise present in the digital image comprises:

processing each selected region to remove a mean pixel value from each pixel in the selected region and obtain an approximation of the noise in each selected region, analyzing the power spectral density (PSD) of the noise in said selected regions, generating a parametric model of the noise present in the digital image based on said PSD of the noise in said selected regions, wherein said generating a parametric model of the noise present in the digital image based on said PSD for each selected region comprises:

taking a discrete Fourier transform of each noise sample, and squaring each resulting frequency component to produce a periodogram, averaging together the periodograms; and selecting a best-fit linear combination of a small set of predefined PSDs.

2. The method of claim 1, wherein said identifying regions of approximately constant pixel value within the digital image comprises:
defining a plurality of regions in the digital image;
discarding any of said defined regions in which pixel values are saturated or clipped to generate a set of remaining regions;
analyzing said remaining regions to determine variation among pixel values within each remaining region; and
identifying said remaining regions having lower variation among pixel value.

3. The method of claim 2, wherein said defining a plurality of regions comprises allowing a user to select said regions.

4. The method of claim 2, wherein said defining a plurality of regions comprises:
setting a region size for each of said plurality of regions; and
using a random sampling pattern such that said plurality of regions include approximately all of the pixels in the digital image.

5. The method of claim 4, wherein said region size for each of said plurality of regions is between 16 and 32 pixels square.

6. The method of claim 2, wherein said discarding any of said defined regions in which pixel values are saturated or clipped comprises:
computing the average and standard deviation of all pixels in all samples; and
discarding those regions having an average value that is greater than one standard deviation from the overall average.

7. The method of claim 1, wherein said identifying regions of approximately constant pixel value comprises allowing a user to select said regions.

8. The method of claim 1, wherein said predetermined number of identified regions comprises between 5 and 10 regions.

9. The method of claim 1, wherein said predetermined number of identified regions comprises 7 regions.

10. The method of claim 1, wherein said analyzing the power spectral density of the noise in said selected regions comprises:
applying an auto correlation function (ACF) model to the noise present in each selected region; and
applying a discrete Fourier transform to the ACF model for each selected region to obtain a PSD for the noise in each selected region.

11. The method of claim 1, wherein the pixel value is a vector that includes multiple values or channels and each channel is analyzed independently.

12. The method of claim 11, further comprising using a decorrelating transform to uncorrelate any channels that are initially correlated.

13. The method of claim 1, wherein the pixel value is a vector that includes multiple values or channels and each channel is analyzed independently and simultaneously.

14. The method of claim 1, wherein the digital image comprises a plurality of frames and each frame is analyzed independently and simultaneously.

15. The method of claim 1, further comprising performing a homomorphic transformation on each pixel value prior to the analysis and a reverse transformation following the analysis.

16. A computer readable medium containing computer executable instructions for analyzing noise content in a digital image, which, when operating in a processor cause the processor to perform the functions of:
identifying regions of approximately constant pixel value within the digital image;
selecting a predetermined number of said identified regions based on pixel value variances within each said identified region;
analyzing said selected regions to generate a mathematical model of noise present in the digital image, wherein said analyzing said selected regions to generate a mathematical model of the noise present in the digital image comprises:
processing each selected region to remove a mean pixel value from each pixel in the selected region and obtain an approximation of the noise in each selected region,
analyzing the power spectral density (PSD) of the noise in said selected regions,
generating a parametric model of the noise present in the digital image based on said PSD of the noise in said selected regions, wherein said generating a parametric model of the noise present in the digital image based on said PSD for each selected region comprises:
taking a discrete Fourier transform of each noise sample, and
squaring each resulting frequency component to produce a periodogram,
averaging together the periodograms; and
selecting a best-fit linear combination of a small set of predefined PSDs.

17. The computer readable medium of claim 16, wherein said identifying regions of approximately constant pixel value within the digital image comprises:
defining a plurality of regions in the digital image;
discarding any of said defined regions in which pixel values are saturated or clipped to generate a set of remaining regions;
analyzing said remaining regions to determine variation among pixel value within each remaining region; and
identifying said remaining regions having lower variation among pixel value.

18. The computer readable medium of claim 17, wherein said defining a plurality of regions comprises:
setting a region size of between 16 and 32 pixels square for each of said plurality of regions; and
using a random sampling pattern such that said plurality of regions include approximately all of the pixels of the digital image.

19. The computer readable medium of claim 17, wherein said discarding any of said defined regions in which pixel values are saturated or clipped comprises:
computing the average and standard deviation of all pixels in all samples; and
discarding those regions having an average value that is greater than one standard deviation from the overall average.

20. The computer readable medium of claim 16, wherein said predetermined number of identified regions comprises between 5 and 10 regions.

21. The computer readable medium of claim 16, wherein said analyzing the power spectral density of the noise in said selected regions comprises:
applying an auto correlation function (ACF) model to the noise present in each selected region; and applying a discrete Fourier transform to the ACF model for each selected region to obtain a PSD for the noise in each selected region.

22. The computer readable medium of claim 16, wherein the pixel value is a vector that includes multiple values or channels and each channel is analyzed independently.

23. A software program product for use with a processor, the software program product comprising processor readable program code for analyzing noise content in a digital image, wherein when said processor readable program code is executed in a processor, said processor readable program code causes said processor to perform the functions of:

identifying regions of approximately constant pixel value within the digital image;

selecting a predetermined number of said identified regions based on pixel value variances within each said identified region;

analyzing said selected regions to generate a mathematical model of noise present in the digital image, wherein said analyzing said selected regions to generate a mathematical model of the noise present in the digital image comprises:

processing each selected region to remove a mean pixel value from each pixel in the selected region and obtain an approximation of the noise in each selected region, analyzing the power spectral density (PSD) of the noise in said selected regions, generating a parametric model of the noise present in the digital image based on said PSD of the noise in said selected regions, wherein said generating a parametric model of the noise present in the digital image based on said PSD for each selected region comprises:

taking a discrete Fourier transform of each noise sample, and squaring each resulting frequency component to produce a periodogram, averaging together the periodograms; and selecting a best-fit linear combination of a small set of predefined PSI)s.

24. The software program product of claim 23, wherein said identifying regions of approximately constant pixel value within the digital image comprises:

defining a plurality of regions in the digital image;

discarding any of said defined regions in which pixel values are saturated or clipped to generate a set of remaining regions;

analyzing said remaining regions to determine variation among pixel value within each remaining region; and identifying said remaining regions having lower variation among pixel value.

25. The software program product of claim 24, wherein said defining a plurality of regions comprises:

setting a region size for each of said plurality of regions; and using a random sampling pattern such that said plurality of regions include approximately all of the pixels in the digital image.

26. The software program product of claim 25, wherein said region size for each of said plurality of regions is between 16 and 32 pixels square.

27. The software program product of claim 24, wherein said discarding any of said defined regions in which pixel values are saturated or clipped comprises:

computing the average and standard deviation of all pixels in all sample, and discarding those regions having an average value that is greater than one standard deviation from the overall average.

28. The software program product of claim 23, wherein said identifying regions of approximately constant pixel value comprise allowing a user to select said regions.

29. The software program product of claim 23, wherein said predetermined number of identified regions comprises between 5 and 10 regions.

30. The software program product of claim 23, wherein said predetermined number of identified regions comprises 7 regions.

31. The software program product of claim 23, wherein said analyzing the power spectral density of the noise in said selected regions comprises:

applying an auto correlation function (ACF) model to the noise present in each selected region; and applying a discrete Fourier transform to the ACF model for each selected region to obtain a PSD for the noise in each selected region.

32. The software program product of claim 23, wherein said analyzing the power spectral density of the noise in said selected regions comprises:

applying an auto correlation function (ACF) model to the noise present in each selected region; and applying a discrete Fourier transform to the ACF model for each selected region to obtain a PSD for the noise in each selected region.

33. The software program product of claim 23, wherein the pixel value is a vector that includes multiple values or channels and each channel is analyzed independently.

34. The software program product of claim 33, further comprising using a decorrelating transform to uncorrelate any channels that are initially correlated.

35. The software program product of claim 23, wherein the pixel value is a vector that includes multiple values or channels and each channel is analyzed independently and simultaneously.

36. The software program product of claim 23, further comprising:

performing a homomorphic transformation on each pixel value prior to the analysis and a reverse transformation following the analysis.

37. A method of analyzing noise content in a digital image, the method comprising:

identifying regions of approximately constant pixel value within the digital image, wherein said identifying comprises:

defining a plurality of regions in the digital image;

discarding any of said defined regions in which pixel values are saturated or clipped to generate a set of remaining regions;

analyzing said remaining regions to determine variation among pixel value within each remaining region; and identifying said remaining regions having lower variation among pixel value;

selecting a predetermined number of said identified regions based on pixel value variances within each said identified region;

analyzing said selected regions to generate a mathematical model of noise present in the digital image, wherein said analyzing said selected regions to generate a mathematical model of the noise present in the digital image comprises:

processing each selected region to remove a mean pixel value from each pixel in the selected region and obtain an approximation of the noise in each selected region, analyzing the power spectral density (PSD) of the noise in said selected regions, generating a parametric model of the noise present in the digital image based on said PSD of the noise in said selected regions, wherein said generating a parametric model of the noise present in the digital image based on said PSD for each selected region comprises:

taking a discrete Fourier transform of each noise sample, and squaring each resulting frequency component to produce a periodogram, averaging together the periodograms; and selecting a best-fit linear combination of a small set of predefined PSDs.

38. The method of claim 37, wherein said defining a plurality of regions comprises:

setting a region size for each of said plurality of regions; and using a random sampling pattern such that said plurality of regions include approximately all of the pixels in the digital image.

39. The method of claim 37, wherein said predetermined number of identified regions comprises between 5 and 10 regions.

40. The method of claim 37, wherein said analyzing the power spectral density of the noise in said selected regions comprises:

applying an auto correlation function (ACF) model to the noise present in each selected region; and applying a discrete Fourier transform to the ACF model for each selected region to obtain a PSD for the noise in each selected region.

* * * * *

UNITED STATES PATENT AND TRADEMARK OFFICE
CERTIFICATE OF CORRECTION

PATENT NO. : 6,990,252 B2
DATED : January 24, 2006
INVENTOR(S) : Jonathan Martin Shekter It is certified that error appears in the above-identified patent and that said Letters Patent is hereby corrected as shown below:

<u>Column 19,</u>
Line 41, delete "PSI)s" and replace with -- PSD's --.

<u>Column 20,</u>
Line 6, delete "comprise" and replace with -- comprises --.

Signed and Sealed this

Twenty-eighth Day of March, 2006

JON W. DUDAS
*Director of the United States Patent and Trademark Office*